Patented June 2, 1936

2,042,684

UNITED STATES PATENT OFFICE 2,042,684

METHOD OF SECURING A HOMOGENEOUS MIXTURE OF HARD MATERIALS AND MATRIX METALS

Ejner Schjöth, Lyons, France

No Drawing. Application May 7, 1934, Serial No. 724,451. In France July 26, 1933

7 Claims. (Cl. 75—137)

This invention relates to a composition of matter, and the production thereof, and with regard to certain more specific features, to solid dispersions of hard materials in a matrix of relatively soft material, such as are used for the manufacture of tools and dies, and the like.

Among the several objects of the invention may be noted the provision of a composition of matter of the class described wherein the hard material and the matrix material are more intimately and homogeneously mixed, whereby a product of greater uniformity and other desirable characteristics is had; the provision of a method of intermixing the said hard components and matrix components, to a more complete degree, and at a lesser cost than has heretofore been possible; the provision of a process of the class described which is adapted to handle various constituent materials in various proportions, without affecting the desirable characteristics of the product; and the provision of a process of the class described which may be carried out more economically than prior analogous processes. Other objects will be in part obvious and in part pointed out hereinafter.

The invention accordingly comprises the elements and combinations of elements, steps and sequence of steps, and features of composition and synthesis, which will be exemplified in the products and processes hereinafter described, and the scope of the application of which will be indicated in the following claims.

Compositions of matter of the class herein described are in general use for making cutting or abrading tools, such as bits, shavers, milling cutters, drills, and the like, and also for making certain classes of dies. This utility is found because of the particular hardness of one of the constituent parts of the mixture. Generally speaking, the mixture or composition of matter herein concerned comprises a finely divided hard material, which is embedded or bonded in a matrix of a relatively softer metal.

Among the suitable hard materials for the present invention are the carbides of the several metals of the sixth group of Mendeleef's periodical table (including tungsten, molybdenum, chromium and the like). For practical purposes, tungsten carbide is found to be the most suitable hard material. The invention, however, equally comprehends other similar hard materials.

As the bonding or matrix metal, a metal or alloy which is softer and more easily melted than the hard metal, is usually employed. Such metals, for example, comprise cobalt, nickel, copper, iron, or the like. Nickel is usually considered the most practical metal to employ.

For purposes of description herein, the terms "hard material" and "matrix metal" will hereinafter be used to designate broadly the classes of substances above identified.

Various processes have from time to time been suggested for preparing a product similar to that of the present invention. All of these have been designed, to a greater or less extent, to overcome the problem of securing a sufficiently intimate mixture of the hard material and matrix metal, so that the resultant product will be homogeneous throughout. However, in all of the processes heretofore offered, either the mixing has not been carried to the optimum extent, considering the ultimate product, or it has been achieved only with so great an expenditure of power and time that its cost has been prohibitive. The present invention provides a method of mixing the hard constituents and the matrix metal to a degree of thoroughness not heretofore achieved, and at a relatively low cost.

A further advantage of the present invention is that all mixing is achieved at relatively low temperatures, so that harmful recrystallization and consequent increase in grain size, of the hard material in the composition, resulting from high intermediate-stage temperatures, are avoided.

Broadly, the present invention comprises effecting separate suspensions, preferably colloidal or nearly so, of the hard material and matrix metal. The two colloidal suspensions are then mixed. As the electric charge on the particles of hard material in suspension differs from the electric charge on the particles of matrix metal in suspension, the various particles attract each other to a greater or less extent, and adhere together in obeyance to the laws of adsorption. Thereafter, the particles flake or precipitate out from the liquid medium and rapidly deposit as a sediment in the bottom of the container. The liquid is then removed, by decanting, or otherwise, and the remaining sediment dried. It is then in the condition of a very fine pulverulent mixture. It may be flowed or poured into molds of the desired shape and thereafter sintered at a temperature which will cause the formation of a coherent mass, which is the product of the invention.

Applying these general principles to a specific example, the following is the process employed:

Tungsten carbide and metallic nickel are separately pulverized to extremely fine, homogeneous powders. This pulverizing may be accomplished by mechanical means, as with a colloid mill of suitable design, or the particles may be prepared ab initio in their fine condition by chemical means, such as by their production by precipitation in solutions. In any event, the powders should be of such fineness that they will remain suspended in pure water for several minutes.

The powders are then separately suspended in liquid media. Distilled water, for example, may be used. In order to facilitate dispersion, a small portion of a suitable ionizing substance may be added. For example, ammonium carbonate may be added to the extent of 5% by weight of the solution. Ammonium carbonate, it will be understood, is merely typical of ionizing media which may be employed. The particular advantage of ammonium carbonate is that, in the subsequent heating stage of the process, it is easily and completely volatilized out of the residual material.

The suspensions are generally of a colloidal nature, but it is to be understood that it is not entirely essential that the particle size be so small as to constitute true colloids. If the particle size is such that the suspension will persist for a few minutes time, it is in general satisfactory for the purposes of the present invention.

The separately prepared suspensions are now poured together or emulsified, one with the other. This mixing is preferably done in a vacuum mixer, or the like, in order positively to prevent formation of any froth or foam, as froth and foam are not conducive to a thorough intermixing of the components. Mechanical stirring is desirably utilized during the mixing step.

Soon after the mixing, flocculation and precipitation commence, due to the difference in electro-positivity of the tungsten carbide particles and the metallic nickel particles. In the course of a relatively short time substantially all of the particles will have precipitated and sunk to the bottom of the container in the form of a sediment or sludge. At this time, the supernatant water may be decanted or otherwise removed from the sediment.

The sediment is then dried, preferably in a vacuum. Due to the manner of its formation, it comprises as nearly a complete mechanical intermixture of tungsten carbide and metalic nickel as it is theoretically possible to achieve. The mixture, however, is still in the form of a free-flowing powder.

This powder is poured into suitable molds, and thereafter sintered at a temperature of the order of 1750° C., whereby the nickel particles are melted to an extent sufficient to coalesce and form a binder or matrix for the tungsten carbide particles. Upon cooling, the product is a completely homogeneous, extremely hard substance, which has the uses and advantages above indicated.

The particular temperature at which the sintering is carried out depends to a large part upon the characteristics of the matrix metal. Nickel, for example, calls for a sintering temperature of the order of 1750° C. Other matrix metals, including most of those finding ready practical application in this field, require sintering temperatures from the order of 1750° C. to 1800° C.

It will readily be seen that the precise proportions of the two components in the ultimate mixture may readily be controlled by controlling the relative concentration, or volumes, of the individually prepared suspensions. For example, if it is desired in the ultimate product to have twice as much tungsten carbide as nickel, this may be achieved by making the initial tungsten carbide suspension twice the concentration of the initial nickel suspension, and then mixing equal volumes of the two suspensions. The flocculation and precipitation phenomena take place readily over wide variations of relative concentration.

While true colloidal suspensions are desirable in the present invention, in order to achieve a maximum perfection of intermixture and homogeneity in the resulting product, it is readily possible to produce a product considerably superior to those of prior processes even though the separate initial suspensions are not quite of a true colloidal character. However, as has been heretofore stated, it is necessary that the fineness of the particles be such that the suspensions will persist, in the particular liquid medium employed, for a sufficient length of time to allow the electrochemical flocculation and precipitation to take place.

It will also be seen that the present invention, considered broadly, provides a new method of making solid mixtures of a greater homogeneity than heretofore achieved, regardless of the character of the individual components, so long as their electropositivity factors are such as to cause the precipitation phenomena referred to.

In view of the above, it will be seen that the several objects of the invention are achieved and other advantageous results attained.

As many changes could be made in carrying out the above compositions and processes without departing from the scope of the invention, it is intended that all matter contained in the above description shall be interpreted as illustrative and not in a limiting sense.

I claim:

1. The method of securing a homogeneous mixture of hard materials and matrix metals comprising separately bringing said hard materials and said matrix metals to a substantially colloidal particle size, separately effecting substantially colloidal suspensions of said hard materials and said matrix metals of opposite electric charges in liquid media, and mixing said separate colloidal suspensions, whereby the hard material and matrix metal particles flocculate and precipitate in a highly mixed condition, and thereafter removing the liquid media from the precipitate, and drying and sintering the same, whereby a coherent, homogeneous mass is obtained.

2. The method as set forth in claim 1, in which the liquid media are slightly ionized by the addition of an ionizing salt.

3. The method as set forth in claim 1, in which the liquid media are slightly ionized by the addition of an ionizing salt adapted to be volatilized from the mass during the subsequent sintering.

4. The method as set forth in claim 1, in which the liquid media are slightly ionized by the addition of an ionizing salt comprising ammonium carbonate.

5. The method of securing a homogeneous mixture of hard materials and matrix metals comprising separately bringing a matrix metal and a carbide of a metal of the sixth group of the periodical classification of the elements to a substantially colloidal particle size, separately effecting substantially colloidal suspensions of said carbide and matrix metal of opposite charge in an aqueous medium, and mixing said separate colloidal suspensions, separating the precipitate formed, drying and sintering the same.

6. The method as claimed in claim 5, in which the carbide is tungsten carbide.

7. The method as set forth in claim 5, in which the carbide is tungsten carbide and the matrix metal is nickel.

EJNER SCHJÖTH.